United States Patent [19]

Itoh

[11] 3,760,382

[45] Sept. 18, 1973

[54] SERIES-PARALLEL SHIFT REGISTER MEMORY

[75] Inventor: Takayuki Itoh, Kawasaki, Japan

[73] Assignee: Takachiko Koeki Kabushiki Kaisha, Osaka-shi, Japan

[22] Filed: Mar. 3, 1972

[21] Appl. No.: 231,562

[30] Foreign Application Priority Data

Mar. 5, 1971 Japan .............................. 46/11304

[52] U.S. Cl. .... 340/173 RC, 307/221 R, 307/221 C

[51] Int. Cl. . G11c 19/00, G11c 21/00, H03k 23/24

[58] Field of Search ............................ 340/173 RC; 307/221 R, 221 B, 221 C

[56] References Cited

UNITED STATES PATENTS

| | | | |
|---|---|---|---|
| 2,782,305 | 2/1957 | Havens | 307/221 R |
| 3,614,751 | 10/1971 | Yokohama | 340/173 R |
| 3,609,392 | 9/1971 | Tetik | 307/221 C |
| 3,675,049 | 7/1972 | Haven | 307/221 R |

OTHER PUBLICATIONS

Anacker, Memory Employing Integrated Circuit Shift Register Rings, 6/68, IBM Technical Disclosure Bulletin, Vol. 11 No. 1, pp. 12–13a Beausoleil, Shift Register Storage, 10/70, IBM Technical Disclosure Bulletin, Vol. 13 No. 5, pp. 1336–1337

*Primary Examiner*—Bernard Konick
*Assistant Examiner*—Stuart N. Hecker
*Attorney*—Robert E. Burns et al.

[57] ABSTRACT

A digital memory device for handling a number of digital information blocks, in which a plurality of inexpensive shift registers are provided for storing each of the digital information blocks. In a sequence operation mode, a plurality of the shift registers are connected in series to form a large circulating memory, to which a train of many digital information blocks are sequentially stored. In a parallel operation mode, a plurality of the shift registers form respectively small circulating memories by connecting the output of each shift register to the input thereof. Accordingly, the digital information blocks stored in the shift registers can be read out for each digital information block in a random-access manner from the shift registers, which operates as the above mentioned small circulating memories respectively.

8 Claims, 2 Drawing Figures

SERIES-PARALLEL SHIFT REGISTER MEMORY

This invention relates to a digital memory device used, for example, as a character generator in a character display etc. of an input and an output of a computer.

A character-mask scanning system, a trans-matrix system, a wire memory matrix or a core memory matrix has been employed in the art as a character generator for generating character image signals representative of many kinds of characters, such as chinese characters etc. Since the character-mask scanning system and the trans-matrix system are fixed memory systems, change of the styles of character patterns (i.e., a font) and the speed of character generation are limited. On the other hand, the wire memory matrix and the core memory matrix are expensive. Accordingly, in a case where a desired digital information block is to be derived from many kinds of digital information blocks which are distinct binary information trains, a suitable memory device has not yet been proposed if the binary information train is to be formed by a number of bits.

An object of this invention is to provide a digital memory device capable of deriving in a high speed a desired digital information block from a number of digital information blocks in a random-access manner.

In accordance with the principle of this invention, a plurality of inexpensive shift registers are provided for storing each of many digital information blocks, such as a character image signal representative of a single character. In a sequence operation mode, a plurality of the above shift registers are connected in series to form a large circulating memory, to which a train of many digital information blocks are sequentially stored. In a parallel operation mode, a plurality of the above mentioned shift registers form respectively small circulating memories by connecting the output of each shift register to the input thereof. Accordingly, the digital information blocks stored in the shift registers can be read out for each digital information block in a random-access manner from the shift registers, which operate as the above mentioned small circulating memories respectively.

The principle, construction and operation of this invention will be better understood from the following more detailed discussion taken in conjunction with the accompanying drawings, in which the same or equivalent parts are designated by the same reference numerals, characters and symbols, and in which.

Figure 1:
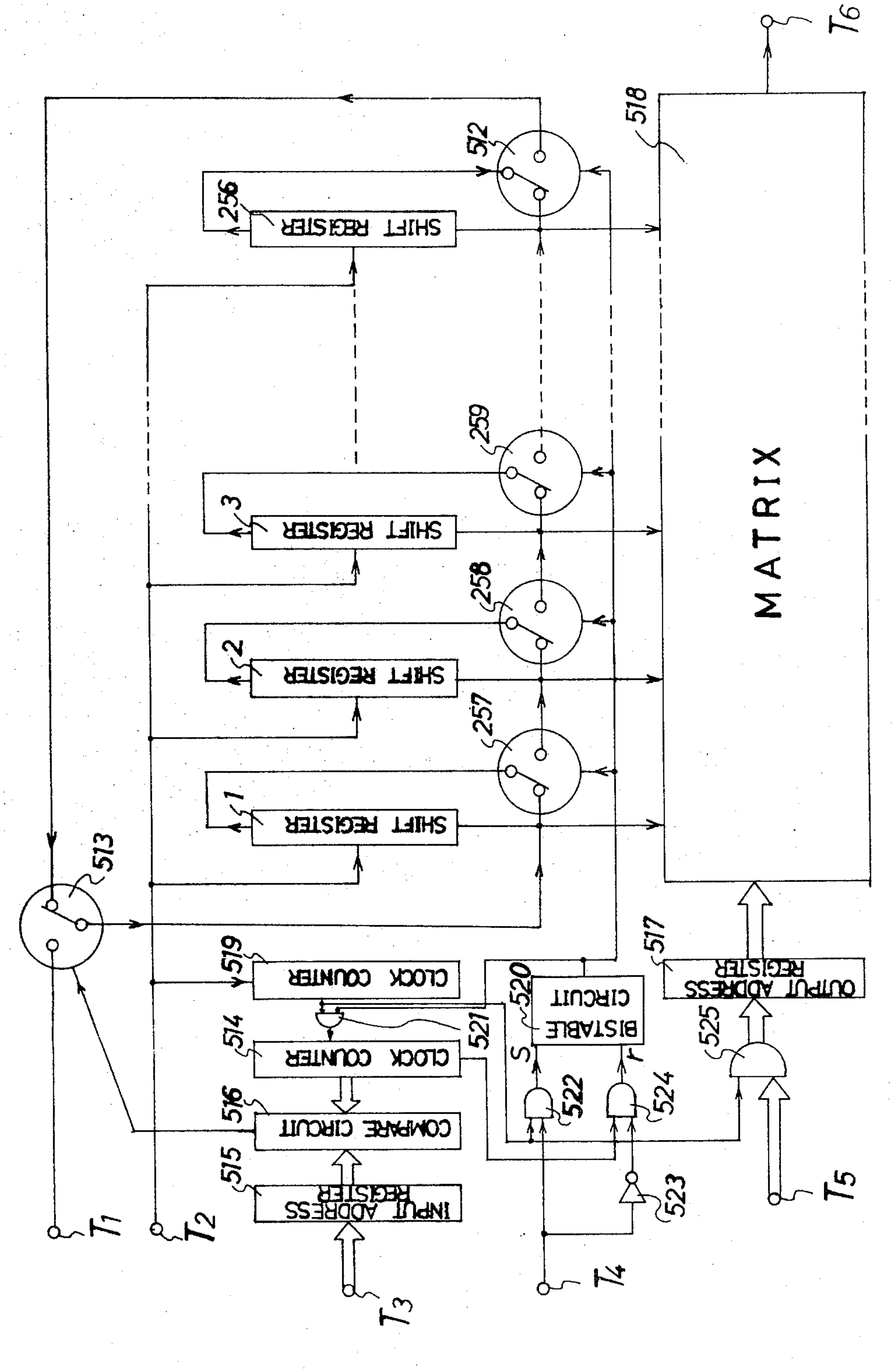
FIG. 1 is a block diagram illustrating an embodiment of this invention.

With reference to FIG. 1, an embodiment of this invention for handling 256 digital information blocks of 512 bits comprises 256 MOS dynamic shift registers 1 to 256 each having the same capacity of 512 bits first switching means comprises, switches 257 and 512 for simultaneously switching the above mentioned sequence operation mode and the above mentioned parallel operation mode of the shift registers 1 to 256, and second switching means comprises a switch 513 inserted at a desired position in a closed loop of a large circulating memory which is formed by the shift register in the sequence operation mode. Input image signals applied from an input terminal $T_1$ are stored through the switch 513 in the loop of the large circulating memory opened at the switch 513. A clock counter 519 has the same scale as that of each shift register 1, 2, .... or 256 and counts clock pulses applied from a terminal $T_2$. A clock number 514 has a scale equal to the total number (i.e., 256) of the shift registers 1 to 256. Means for selecting a shift register includes an input address register 515 is employed for temporarily storing an input address code, which is applied from a terminal $T_3$ and designates one of the shift registers 1 to 256 at the above mentioned sequence operation mode (i.e., input application mode for applying a character image signal) as a shift register to be employed for storing the applied character image signal. Means for developing a second switching signal includes a compare circuit 516 generates a control output or second switching signal applied to the switch 513, so that the switch 513 is switched so as to insert the input image signal from the terminal $T_1$ to the loop of the large circulating memory only during a time where contents of the clock counter 514 and the input address register 515 coincide with each other. An output address register 517 is employed for temporarily storing an output address code, which is applied from a terminal $T_5$ and designates one of the shift registers 1 to 256 at the above mentioned parallel operation mode (i.e., output reading-out mode for reading out a character image signal stored) as a shift register to be read out therefrom the stored character image signal. A selecting circuit 518 is a matrix by way of example and is employed for selecting one of the outputs of the shift registers 1 to 256 designated in accordance with contents of the output address register 517. Means for developing a first switching signal includes a bistable circuit 520 set by an output of an AND circuit 522 and reset by an output of an AND circuit 524. An output of the bistable circuit 520 simultaneously switches the switches 257 to 512 and opens an AND circuit 521. An input/output mode switching signal, which assumes distinct states for the input application mode and the output reading-out mode, is applied to a terminal $T_4$.

In operation, means for writing individual blocks of data comprises the steps wherein the clock counter 519 counts clock pulses from the terminal $T_2$. After the input/output mode switching signal applied from the terminal $T_4$ is switched to a first state corresponding to the input application mode and the AND 522 circuit is therefore opened, a first carry pulse generated from the clock counter 519 sets the bistable circuit 520 through the AND circuit 522 opened. Accordingly, the switches 257 and 512 are simultaneously switched, so that the shift registers 1 to 256 assume the large circulating memory together with the switched switches 257 to 512 which are respectively inserted between adjacent two of the shift registers 1 to 256. The first carry pulse of the clock counter 519 passes through the AND circuit 521 opened in response to the set of the bistable circuit 520 and is applied to the clock counter 514. Thereafter, the number of carry pulses of the clock counter 519, which is a scale-of-512 counter in this embodiment, is counted by the counter 514.

In response to the above switching to the input application mode of the input/output mode switching signal, the input address code is transferred through the terminal $T_3$ to the input address register 515. Thus compare signal 516 generates the control circuit only during a time where contents of the clock counter 514 and the input address register 515 concide with each other. The switch 513 is switched only during the duration of this control signal from the compare circuit 516, so that the closed loop of the large circulating memory is opened at the switch 513. The input image signal from the terminal $T_1$ is inserted into the opened loop of the large circulating memory through the switched switch 513. Since the clock counter 519 has the same scale of each shift register 1, 2, ... or 256, a second carry pulse from the clock counter 519 is generated when a chamber image signal of 512 bits has been inserted in the large circulating memory. In response to the second carry pulse, the counting state of the counter 514 is counted-up by "1". Accordingly, since the contents of the counter 514 and the input address register 515 do not coincide with each other, the control signal from the compare circuit 516 is stopped and the switch 513 is then restored as shown in FIG. 1.

At this time, the state of the input/output mode switching signal is changed so that the AND circuit 522 is closed while the AND circuit 524 is opened. Means for disenabling this first switching signal is effected when a carry pulse is generated from the counter 514, this carry pulse passes through the opened AND circuit 524 and resets the bistable circuit 520 so that the switches 257 to 512 are restored as shown in FIG. 1. Accordingly, the shift registers 1 to 256 assume respectively small circulating memories, and the applied input character image signal is stored in one of the shift registers 1 to 256 (i.e., circulating memories) designated by the input image address code applied from the terminal $T_3$.

As understood from the above explanation, another character image signal can be stored in any one of the shift registers 1 to 256 (i.e., the small circulating memories) by applying an input address code corresponding to the selected shift register 1, 2, ... or 256 from the terminal $T_3$ to the input address register 515.

When a character image signal is to be read out from selected one of the shift registers 1 to 256 (i.e., the small circulating memories), means for reading comprises steps wherein an address code designating the selected shift register is applied to matrix means including the terminal $T_5$. This address code passes through the AND circuit 525, which is opened in response to a carry pulse from the clock counter 519, and is transferred to the output address register 517. The matrix 518 selects one of the shift registers 1 to 256 (i.e., the small circulating memories) in accordance with the output address code transferred to the output address register 517. In this case, since the scale of the clock counter 519 is equal to the capacity of each shift register 1, 2, ... or 256, since the clock counter 519 and the shift registers 1 to 256 are controlled by the same clock pulses from the terminal $T_2$, and since the output address code is transferred to the output address register 517 in response to the carry pulse from the clock counter 519, the character image signal is read out from its first bit in any case.

Figure 2:
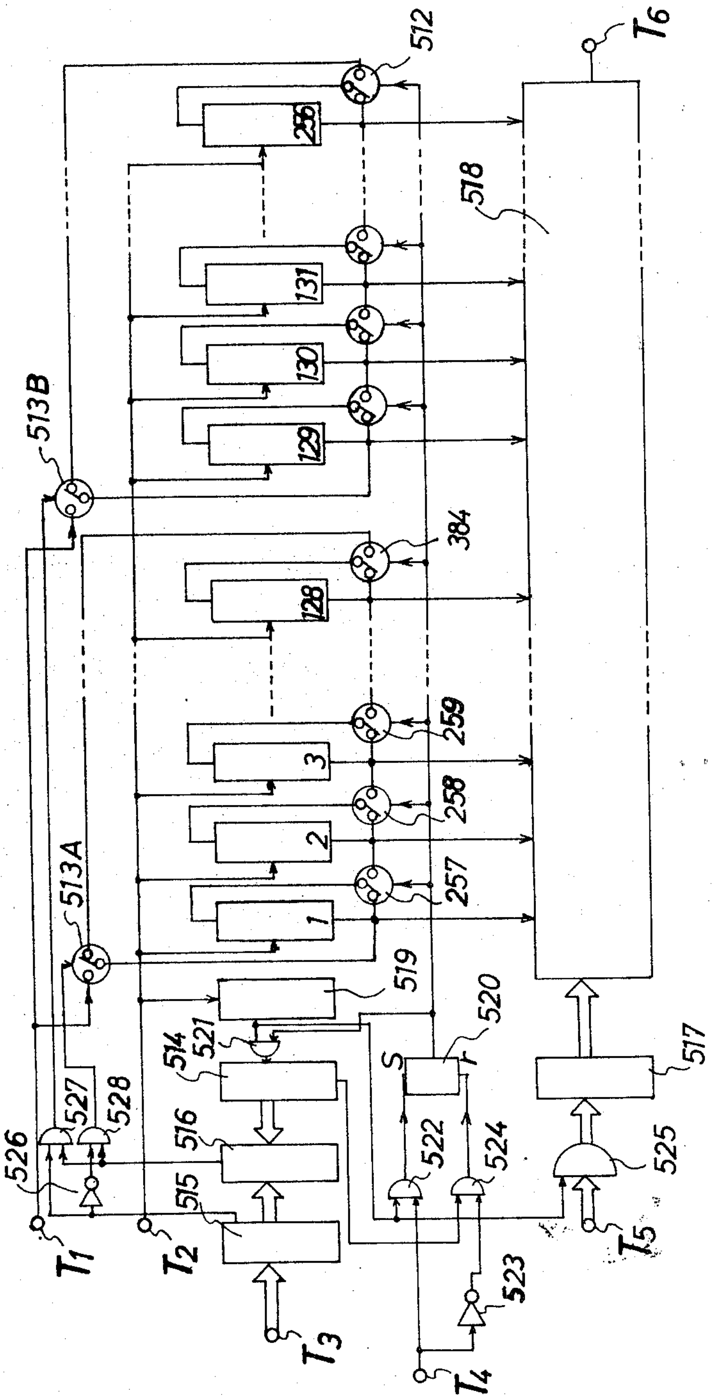
FIG. 2 is a block diagram illustrating another embodiment of this invention.

In the embodiment shown in FIG. 1, one grand cycle of the large circulating memory is necessary at its maximum for storing a character image signal in the above input application mode. This necessary time is one half the grand cycle of the large circulating memory on the average. FIG. 2 shows another embodiment of this invention for reducing the necessary time for inserting a character image signal into one half that of the embodiment shown in FIG. 1. In FIG. 2, the large circulating memory is divided into two parts A and B, which are respectively selected by switches 513A and 513B. The most significant digit (MSD) of the input address code stored in the input address register 515 controls an AND circuit 527 and, through an inverter 526, an AND circuit 528. If the AND circuit 527 is opened, the control output from the compare circuit 516 is applied to the switch 513B to select a second part B of the circulating memory including the registers 129 to 256. If the AND circuit 528 is opened, the control output from the compare circuit 516 is applied to the switch 513A to select a first part A of the circulating memory including the registers 1 to 128. Since construction and operations of other parts can be readily understood in view of the above description of the embodiment shown in FIG. 1, details are omitted.

Each of the shift registers 1 to 256 can be formed by a magnetostrictive delay line memory or a static shift register etc. If a static shift register is employed, clock pulses may be stopped after completion of storing an input character image signal and then applied only a desired read out time.

It is desirable for high efficient utilization of this invention that only binary information blocks each having a high frequency in use are stored in the shift registers (1 to 256) forming the small circulating memories, and that binary information blocks each having a low frequency in use are transferred from a large capacity memory of low price at need.

If other output selecting means comprising the terminal $T_5$, the AND circuit 525, the output address register 517 and the matrix 518 is further provided, the small circulating memories (1 to 256) are accessable from a plurality of external devices.

I claim:

1. A digital memory device, comprising:

a plurality of shift registers each having a predetermined memory capacity of the same bits and an input and an output and each responsive to the same clock pulses for shifting data from the input to the output, a plurality of first switches respectively provided for said shift registers for connecting the input and output of each of said shift registers to each other to form a plurality of small circulating memories in a parallel operation mode and connecting the respective outputs of said shift registers to respective inputs of succeeding ones of said shift registers to form a large circulating memory in a sequence operation mode, a second switch inserted in the loop of said large circulating memory for switching said large circulating memory between a closed loop and an open loop, input terminal means receptive of input digital information blocks and coupled with said second switch for inserting one input digital information block into said open loop of said large circulating memory through said second switch, a counter having a scale corresponding to the capacity of all of said shift registers for counting said clock pulses, an input address register having a capacity corresponding to at least the predetermined higher digits of said counter corresponding to the number of shift registers and receptive of an input addres code for storing same to designate one of said shift registers to be written into, a comparator coupled to said counter and said input address register for generating a control signal only during a time when the contents of said counter and said input address register coincide with each other, said control signal being applied to said second switch to switch from said closed loop to said open loop, an output address register receptive of an output address code for temporarily storing same to designate one of said shift registers to be read out of and, selecting means coupled to said output address register and said shift registers for reading out said input digital information block by selecting one of said shift registers in accordance with said output address code in said parallel operation mode.

2. A digital memory device according to claim 1. in which said shift registers comprise MOS shift registers.

3. A digital memory device, comprising:

a plurality of shift registers each having a predetermined memory capacity of the same bits and an input and an output and each responsive to the same clock pulses for shifting data from the input to the output, a plurality of first switches respectively provided for said shift registers for connecting the input and output of each of said shift registers to each other to form a plurality of small circulating memories in a parallel operation mode and connecting the respective output of said shift resisters to respective inputs of succeeding ones of said shift registers to form a plurality of large circulating memories in a sequence operation mode, a plurality of second switches inserted respectively in the loops of said large circulating memories for switching the corresponding one of said large circulating memories between a closed loop and an open loop, input terminal means receptive of input digital information blocks and coupled with said second switches for inserting one input digital information block to said open loop of one of said large circulating memories through one of said second switches, a counter having a scale corresponding to the capacity of all of said shift registers for counting said clock pulses, an input address register having a capacity corresponding to at least the predetermined higher digits of said counter corresponding to the number of shift registers and receptive of an input address code for storing same to designate one of said shift registers to be written into, a comparator coupled to said counter and said input address register for generating a control signal only during a time when the contents of said counter and said input address register coincide with each other, said control signal being applied to a selected one of said second switches in accordance with said input address code to switch the associated loop from said closed loop to said open loop, an output address register receptive of an output address code for temporarily storing same to designate one of said shift registers to be read out of and, selecting means coupled to said output address register and said shift registers for reading out said input digital information block by selecting one of said shift registers in accordance with said output address code in said aprallel operation mode.

4. A digital memory device according to claim 3, in which said shift registers comprise MOS shift registers.

5. A digital memory device comprising: a plurality of shift registers each storing in operation the same number of bits of data and each having an input for receiving serial data and an output for said serial data, each shift register receiving in operation identical clock pulses applied thereto for shifting said serial data therein from said input to said output; first switching means receptive in operation of a first switching signal for switching from one state wherein the input and the output of each shift register are connected defining a plurality of circulating shift registers and for switching to another state wherein the output of each shift register is connected to the input of the successive shift register for defining a series circuit comprising said plurality of shift registers thereby defining one large circulating shift register; second switching means having one input and an output connected in series with said large circulating shift register wherein said output is connected to the input of one shift register and another input receptive of blocks of bits of serial data to be written into said large circulating shift register and receptive in operation of a second switching signal for switching from one state wherein said output is connected to said one input to another state wherein said output is connected to said another input; means for writing individual blocks of bits of said blocks of bits of serial data into a selected shift register comprising means receptive in operation of a write mode signal applied thereto for developing said first switching signal until disenabled, means receptive of a memory input address code corresponding to said selected shift register for effecting said second switching signal to switch said second switching means when a first bit of serial data from said selected shift register is at said one input of said second switching means until said block of bits of serial data is shifted into said one shift register and means for disenabling said means for developing said first switching signal when said block of bits of serial data is shifted into said selected shift register of said larger circulating shift register; means for reading a block of bits of serial data from a selected shift register comprising matrix means receptive of each output of said plurality of circulating shift registers and receptive in operation of a memory output address code corresponding to said selected shift register applied thereto for connecting a selected one of the plurality of outputs to the output of said matrix means thereby reading from said selected shift register.

6. A digital memory device according to claim 5, wherein said shift registers comprise MOS shift registers.

7. A digital memory device comprising: a plurality of shift registers each storing in operation the same number of bits of data and each having an input for receiving serial data and an output for said serial data, each shift register receiving in operation identical clock pulses applied thereto for shifting said serial data therein from said input to said output; first switching means receptive in operation of a first switching signal for switching from one state wherein the input and the output of each shift register are connected defining a plurality of circulating shift registers and for switching to another state wherein the output of each shift register is connected to the input of the successive shift register for defining two series circuits comprising said plurality of shift registers thereby defining two large circulating shift registers; two second switching means each having one input and an output connected in series with one of said large circulating shift registers wherein said output is connected to the input of one shift register and another input receptive of blocks of bits of serial data to be written into said two large circulating shift registers and each receptive in operation of a second switching signal for switching from one state wherein said output is connected to said one input to another state wherein said output is connected to said another input, means for writing individual blocks of bits of said blocks of bits of serial data into a selected shift register comprising means receptive in operation of a write mode signal applied thereto for developing said first switching signal until disenabled, means receptive of a memory input address code corresponding to said selected shift register for effecting said second switching signal to switch the second switching means corresponding to the large circulating shift register containing said selected shift register when a first bit of serial data from said selected shift register is at said one input of said second switching means until said block of bits of serial data is shifted into the one shift register of said large circulating shift register and means for disenabling said means for developing said first switching signal when said block of bits of serial data is shifted into said selected shift register of said larger circulating shift register; means for reading a block of bits of serial data from a selected shift register comprising matrix means receptive of each output of said plurality of circulating shift registers and receptive in operation of a memory output address code corresponding to said selected shift register applied thereto for connecting a selected one of the plurality of outputs to the output of said matrix means thereby reading from said selected shift register.

8. A digital memory device according to claim 7, wherein said shift register comprise MOS shift registers.

* * * * *